United States Patent [19]
Yasugi et al.

[11] 4,335,612
[45] Jun. 22, 1982

[54] METHOD OF DETECTING IRREGULARITIES ON BEVEL GEARS

[75] Inventors: Masahiko Yasugi, Okazaki; Shigeru Takahashi; Toshio Hashimoto, both of Toyota, all of Japan

[73] Assignee: Toyota Jidosha Kogyo Kabushiki Kaisha, Aichi, Japan

[21] Appl. No.: 193,140

[22] Filed: Oct. 2, 1980

[30] Foreign Application Priority Data

Nov. 22, 1979 [JP] Japan .................. 54-151793

[51] Int. Cl.³ .......................................... G01M 13/02
[52] U.S. Cl. ................................................ 73/593
[58] Field of Search ..................... 73/593, 659, 660

[56] References Cited

U.S. PATENT DOCUMENTS

| | | | |
|---|---|---|---|
| 1,981,693 | 11/1934 | Firestone et al. | 73/593 |
| 2,965,971 | 12/1960 | Pomernacki | 73/593 |
| 3,842,663 | 10/1974 | Harting et al. | 73/593 |

Primary Examiner—Stephen A. Kreitman
Attorney, Agent, or Firm—Birch, Stewart, Kolasch & Birch

[57] ABSTRACT

Two bevel gears are meshed together and rotated around their central axes in mesh, one of them transmitting power to the other. One of the gears is moved relative to the other, so that the meshing area between their teeth moves on the tooth surface of at least one of them. Occurrence of vibration is detected by a vibration detector. Thereby irregularities are tested for.

7 Claims, 3 Drawing Figures

METHOD OF DETECTING IRREGULARITIES ON BEVEL GEARS

BACKGROUND OF THE INVENTION

The present invention relates to a method for detecting irregularities on bevel gears, and, more particularly, relates to a method of detecting irregularities on either of a matched pair of bevel gears which are meshed together.

In general, bevel gears, such as hypoid gears for differential gear mechanisms of automobiles, are inspected to check for existence of any irregularities, such as scratches or damage, on the surface of their teeth, after the surfaces of these teeth have been finally machined and finished.

A conventional method for performing such checking for the existence of irregularities on bevel gears has been performed by meshing a matched pair of these gears together in a tooth contact testing machine, rotating one of the gears so as to drive the other gear, which is subjected to a certain load so as to maintain a certain desirable loading between the meshed teeth of the gears, and by detecting the presence of any vibration at this time with a vibration detector. However, since conventionally the meshed bevel gears are rotated with their axial lines and their positions along their axial lines remaining constant, the parts of these gears which are actually meshed together remain limited to particular areas of their toothed surfaces.

Therefore, it has not been possible with the above mentioned method to check for irregularities over the entire surfaces of the bevel gear wheel teeth. In other words, it has only been possible, with the above outlined method, to check for the existence of damage or defects in the particular areas of the teeth of the meshed bevel gear wheels which are at the time actually in force transmitting contact with one another.

A further disadvantage of the method above outlined is that it requires that after the wheels have been finally machined they should be mounted to a separate tooth contact testing machine. This requires time, takes trouble, and requires a special additional machine to be provided in the workshop, which is expensive and uses space.

SUMMARY OF THE INVENTION

Therefore, it is an object of the present invention to provide a method for detecting irregularities on bevel gears, which is able to detect irregularities over substantially the entire areas of the surfaces of the teeth thereof.

It is a further object of the present invention to provide a method for detecting irregularities on bevel gears which can be performed during the process of final lapping of the bevel gears, without mounting them to any special machine.

According to the present invention, these objects, and others, are achieved by a method for detecting irregularities upon bevel gears, comprising the steps, performed simultaneously, of: (a) meshing together two bevel gears and rotating each of them around its central axis while they remain in mesh, transmitting power from one of them to the other; (b) further moving the rotating bevel gears relative to one another so that the meshing area between their teeth moves on the tooth surface of at least one of them; and (c) detecting the occurrence of vibration with a vibration detector.

According to such a method as described above, since the vibration due to any irregularity on the toothed surface of the gears is detected while the actual meshed areas of the teeth on the gears are varied along the tooth lengths of the teeth, and is, preferably, varied over substantially the whole area of the surfaces of the teeth, substantially any irregularity anywhere on any of the teeth of the gears can be reliably detected.

As is well known in the art, lap finishing work for bevel gears is generally performed while rotating a pair of the bevel gears while they are meshed together, under load, by moving at least one of the bevel gears along its axial line, and by moving this axial line relative to the other bevel gear, so as to vary the meshed areas of the teeth of the bevel gears along the lengths of these teeth. Therefore, advantageously, the above described method for detecting irregularities on the surfaces of the teeth of the bevel gears, according to the present invention, can be performed as an in-process measurement during this lap finishing work. In this case, it will be only necessary to place a vibration detector somewhere, in an arbitary position, on the lap finishing device. Thereby, a significant advantage can be attained over prior art gear testing devices, in that it is not necessary to mount the bevel gears to a separate testing machine in order to check whether they have irregularities on the surfaces of their teeth or not.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are all of them provided purely for the purposes of illustration and exemplification only, and are in no way to be taken as limitative of the scope of the present invention. In the drawings.

DESCRIPTION OF THE PREFERRED EMBODIMENTS

Figure 1:
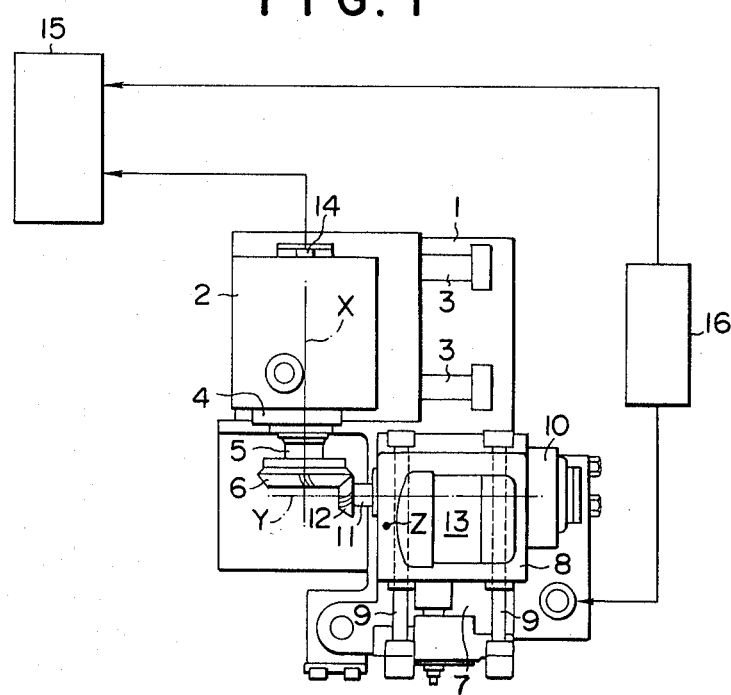
FIG. 1 is a plan view of a lap finishing machine which practices a first embodiment of the method for detecting irregularities in bevel gears according to the present invention.

Referring to FIG. 1, a lap finishing machine has a frame 1, whose upper surface seen in the drawing is substantially horizontal. On the frame 1 there is mounted a vertical post 2, which is fitted on the two horizontal guide bars 3 so as to be slidable to the left and to the right in the drawing. The post 2 may be fixed at an arbitary position along the guide bars 3 by being clamped by a clamping means not shown in the drawing. On the post 2 there is supported a spindle head 4, and this spindle head 4 is vertically slidable up and down on the vertical post 2, and may be clamped thereto by a clamping means not shown in the drawing at an arbitary height thereon.

The spindle head 4 supports rotatably a spindle 5, and the central axial line of this spindle 5 is shown in the drawings by a line X. On the lower end in the drawing of the spindle 5 there is fixed a first bevel gear 6, which is in the process of being lap finished. A suitable braking force is applied to slow the rotation of the spindle 5 by an appropriate braking device which is not shown in the drawing.

Further, on the substantially horizontal upper surface of the machine frame 1 there is mounted a swing table 7. The swing table 7 is movable both to the left and right and up and down in the drawing with respect to the machine frame 1, along guide bars or the like not shown in the drawing, and also may be rotated through a certain relatively small angle in either direction, i.e. may be swung, about a vertical line perpendicular to the plane of the drawing paper through the point Z in FIG. 1. This reciprocal movement is performed by a cam device not shown in the drawing. Further, on the swing table 7 there is a movable table 8, which may be moved with respect to the swing table 7 along the two horizontal guide bars 9, and which may be clamped to these guide bars 9 by a clamping means not shown in the drawing, at an arbitrary position. On the movable table 8 there is supported a second spindle head 10, which, in turn, supports rotatably a second spindle 11 which is rotatable around its central axial line shown in the drawing by Y which is substantially horizontal and also is substantially pependicular to the aforesaid axial line X of the first spindle 5 and first bevel gear 6.

On the left hand end in the drawing of the second spindle 11 there is supported a second bevel gear 12. The second spindle 11 and the second bevel gear 12 are rotatably driven in a reversible manner by an electric motor 13.

The first bevel gear 6 and the second bevel gear 12 are meshed together, and this meshing is controlled by the adjustment of the positions of the vertical post 2 along the two horizontal guide bars 3, the movable table 8 on the machine frame 1, and the second spindle head 10 along the two horizontal guide bars 9, and, when the electric motor 13 is provided with actuating electrical power, it rotatably drives the second bevel gear 12, which then rotatably drives the first bevel gear 6 against the aforesaid braking effect provided by the braking device which is coupled to the first spindle 5. Thereby, lapping of the first bevel gear 6 and the second bevel gear 12 is performed in a per se well known fashion. As the second spindle 11 is rotatably driven by the electric motor 13, and the first bevel gear 6 and the second bevel gear 12 are lapped together, the movable table 8 is reciprocated to and fro around the vertical axis passing through the point Z, and, accordingly, the axial line Y is displaced to and fro with respect to the axial line X of the spindle head 4 in such a way that the meshed areas of the first bevel gear 6 and the second bevel gear 12 move to and fro along substantially the entire lengths of the teeth thereof, and over substantially the whole area of each of the teeth. This is per se well known in the art; for further details, if they are required, reference should be made to Japanese Patent Publication No. 41-3036.

Particularly according to the present invention, any vibration which may be generated by any irregularity on the surface of the teeth of the first bevel gear 6 or the second bevel gear 12 is detected by a vibration detector 14, which is mounted on the first spindle head 4 by a permanent magnet. The vibration detector 14 may be of a per se well known type which comprises a piezoelectric vibration detecting element, which outputs an electrical signal in response to vibration causing deformation thereof. The electrical signal generated by the vibration sensor 14 is supplied to a signal processing device 15.

This signal processing device 15 may be of a type comprising: (a) a signal shaping circuit, for shaping the vibration signal generated by the vibration sensor 14; (b) a standard signal generating circuit, for generating a standard signal by adding a threshold value of a specified level to an averaged continuous signal which is obtained by averaging the output signal of the signal shaping circuit over a specified unit time period; (c) a detecting counter circuit for comparing the signal from the signal shaping circuit with the standard signal, and counting the frequency of reversion of the detecting signal which reverses according to the relation in the magnitude of the two mutually compared signals in a specified unit time, (d) an output device, for producing a specified output according to the counted result provided by the detection counting circuit, and (e) a time control circuit, for producing a time control signal for controlling, in real time, the operation of the standard signal generating circuit and the detection counting circuit. If further detail concerning this signal processing device 15 is required, reference should be had to Japanese Patent Application No. 50-150038.

The signal processing device 15 is given a working cycle signal from a control panel 16 of the lap finishing machine, and the detecting counter circuit of the signal processing device 15 is activated during a specified working cycle of lap finishing, preferably the last lap finishing cycle, for example. By performing the detection of irregularities such as damage on the bevel gear wheels 6 and 12 only during the last working cycle, it is ensured that only irregularities which are not removed during previous working cycles are detected, and therefore any small irregularities which will be ground off during later lap finishing will not be detected. Accordingly, in other words, only irregularities which will be manifested in the finished gear wheels are detected for correction.

As the second spindle 11 is driven by the electric motor 13, and as the movable table 8 is reciprocated to and fro by the actuating cam device (not shown) about the vertical axial line through the point Z, so as to move the meshed area between the first bevel gear 6 and the second bevel gear 12 substantially all over the lengths of the teeth of the two bevel gears 6 and 12, irregularities will be tested for along subtantially the entire meshing surfaces of these bevel gears 6 and 12, and across substantially the entire areas of their teeth. Further, as this area shifts along the length of each of the teeth of the first bevel gear 6 and the second bevel gear 12, lap finishing work is performed along the entire lengths of these teeth, and over the entire area of each tooth. Concurrently with this, as explained above, irregularities are tested for over substantially the entire lengths and surfaces of the teeth.

The particular form of relative motion between the two bevel gears shown in the machine of FIG. 1 which practices the first preferred embodiment of the present invention is not to be considered as limiting of the present invention. In that first embodiment, it is to be noted that a line drawn from the vertical line through the point Z to the point of meshing of the first bevel gear 6 and the second bevel gear 12 is approximately perpendicular to the line of engagement therebetween, or to the crests of the engaged teeth, as may be seen in the drawing. Thereby, when the movable table 8 is rotated about the vertical line through the point Z, the engaged portions of the teeth of the first bevel gear 6 and the second bevel gear 12 are moved to and fro along each of these gears simultaneously, so as to cover substantially the entire length of each of the teeth of each of the gears.

Figure 2:
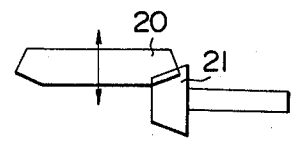
FIGS. 2 and 3 are illustrative drawings for explaining an alternative mode of motion of the two bevel gears with respect to one another, used in practicing a second embodiment of the method for detecting irregularities on the bevel gears according to the present invention.
Figure 3:
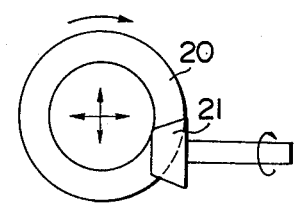

However this is not the only possible form for such relative motion. For example, in FIGS. 2 and 3 there is shown another possible form of relative motion between two bevel gears which satisfies the above requirements. In this case, two bevel gears 20 and 21 are engaged with one another, and, as may be seen in FIG. 2, the bevel gear 20 is moved to and fro along its axial line, i.e. along its axis of rotation, while, as may be seen in FIG. 3, it is also moved perpendicularly to its axial line, both in the direction of the axial line of the other bevel gear 21, and also perpendicularly to the axial line of the other bevel gear 21. Provided that the relative amounts of these three motions are correctly and satisfactorily correlated, it may be arranged that the areas of contact between the teeth of the bevel gears 20 and 21 are desirably moved to and fro along the lengths of these teeth, and also up and down between the tip portions and the root portions of the teeth, while at the same time maintaining an appropriate amount of backlash for lapping between the bevel gears 20 and 21 during the lapping process. Further, a combination of motions such as this may be most appropriate for helically cut bevel gears, according to the angle of the teeth thereof.

Although the present invention has been shown and described with reference to its practice during the final lapping process of two bevel gears, it is not to be considered as limited to an in-process measurement such as this, although this is a convenient application thereof. The method of the present invention could equally be applied to an out-process measurement, using a special testing machine, as a matter of course.

Although the present invention has been shown and described in terms of several preferred embodiments thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiments, or of the drawings.

I claim:

1. A method for detecting irregularities upon bevel gears, comprising the steps, performed simultaneously, of:
    (a) meshing together two bevel gears and rotating each of them around its central axis while they remain in mesh, transmitting power from one of them to the other;
    (b) further moving the rotating bevel gears relative to one another so that the meshing area between their teeth moves on the tooth surface of at least one of them; and
    (c) detecting the occurrence of vibration with a vibration detector.

2. A method according to claim 1, wherein the movement of step (b) substantially consists of rotationally reciprocating one of the bevel gears about an axis perpendicular to both of the central axes of the bevel gears, a line extended perpendicularly from said first mentioned axis to the engaged teeth of the bevel gears being substantially perpendicular to the crest lines of the engaged teeth.

3. A method according to claim 1, wherein the movement of step (b) substantially consists of (d) moving one of the bevel gears with respect to the other in a direction along the axial line of said one bevel gear, (e) moving said one bevel gear also in a direction parallel to the axial line of the other gear, and (f) moving said one bevel gear also in a direction perpendicular to the axial lines of both the gears.

4. A method according to claim 2, wherein the axial lines of the two gears are perpendicular.

5. A method according to claim 3, wherein the axial lines of the two gears are perpendicular.

6. A method according to any one of claims 1–5, wherein the steps (a), (b), and (c) are performed during lap finishing of the bevel gears.

7. A method according to claim 6, wherein the steps (a), (b), and (c) are performed during the final lapping process.

* * * * *